United States Patent
Inal

(10) Patent No.: US 10,232,877 B2
(45) Date of Patent: Mar. 19, 2019

(54) INFINITELY VARIABLE TRANSMISSION FOR DIFFERENTIALLY STEERED VEHICLES

(71) Applicant: Mehmet Koray Inal, Pelkie, MI (US)

(72) Inventor: Mehmet Koray Inal, Pelkie, MI (US)

( * ) Notice: Subject to any disclaimer, the term of this patent is extended or adjusted under 35 U.S.C. 154(b) by 346 days.

(21) Appl. No.: 15/200,866

(22) Filed: Jul. 1, 2016

(65) Prior Publication Data

US 2017/0001664 A1 Jan. 5, 2017

Related U.S. Application Data

(60) Provisional application No. 62/188,188, filed on Jul. 2, 2015.

(51) Int. Cl.
*B62D 11/10* (2006.01)
*F16H 37/08* (2006.01)
*F16H 9/20* (2006.01)

(52) U.S. Cl.
CPC ............ *B62D 11/105* (2013.01); *F16H 9/20* (2013.01); *F16H 37/0813* (2013.01); *F16H 37/0846* (2013.01); *F16H 2037/088* (2013.01)

(58) Field of Classification Search
CPC ....... B62D 11/10; B62D 11/105; B62D 11/12; F16H 37/0846; F16H 2037/088; F16H 9/20
USPC ............................ 475/28, 25; 180/6.2; 474/8
See application file for complete search history.

(56) References Cited

U.S. PATENT DOCUMENTS

| | | | | |
|---|---|---|---|---|
| 2,336,912 A | * | 12/1943 | Zimmermann | B62D 11/183 180/6.44 |
| 3,091,132 A | * | 5/1963 | Mayfield | F16H 37/0846 474/32 |
| 3,133,455 A | * | 5/1964 | White | B62D 11/10 180/6.2 |
| 3,178,965 A | * | 4/1965 | Mayfield | F16H 37/00 475/25 |
| 3,376,760 A | * | 4/1968 | Gordanier | B62D 11/105 474/35 |
| 3,450,218 A | * | 6/1969 | Looker | B62D 11/10 180/6.44 |
| 3,464,510 A | * | 9/1969 | Washizawa | B62D 11/105 180/192 |
| 3,743,043 A | * | 7/1973 | Gelinas | B62D 11/12 180/6.2 |
| 4,273,206 A | * | 6/1981 | van der Lely | F16G 5/18 180/6.2 |

(Continued)

FOREIGN PATENT DOCUMENTS

| | | | | |
|---|---|---|---|---|
| CA | 2915403 A1 | * | 12/2013 | ........... B62D 11/105 |
| GB | 940347 A | * | 10/1963 | ............ B62D 11/10 |

*Primary Examiner* — Ruth Ilan

(57) ABSTRACT

An infinitely variable transmission system for differentially steered vehicles comprises two planetary gearboxes, each coupled to drive, as output, a driving component, such as track or wheel, on either side of a vehicle. The planetary gearboxes are drivingly coupled to a power source, such as an engine or motor, via fixed gear ratio driver and via belt drive system of two or more variable ratio belt drive pulleys. Each of the two outputs of the transmission can independently and simultaneously be controlled to revolve in forward, neutral (stop), and reverse directions in a manner of continuously and infinitesimally variable speed and torque.

4 Claims, 14 Drawing Sheets

(56) References Cited

U.S. PATENT DOCUMENTS

| | | | | |
|---|---|---|---|---|
| 4,700,589 | A | * | 10/1987 | Coronel ................ B62D 11/10 180/6.2 |
| 5,004,060 | A | * | 4/1991 | Barbagli ................ B62D 11/10 180/6.44 |
| 5,021,037 | A | * | 6/1991 | Tervola ............... F16H 37/0846 180/6.2 |
| 5,910,060 | A | * | 6/1999 | Blume .................. B60K 17/04 475/221 |
| 6,342,021 | B1 | * | 1/2002 | Gleasman .............. B62D 11/14 475/18 |
| 2008/0207363 | A1 | * | 8/2008 | Maguire ................ B60K 17/16 474/8 |
| 2013/0316862 | A1 | * | 11/2013 | Brandon .................. F16H 9/04 474/69 |
| 2016/0016608 | A1 | * | 1/2016 | Watling ............... B62D 11/105 74/650 |

* cited by examiner

INFINITELY VARIABLE TRANSMISSION FOR DIFFERENTIALLY STEERED VEHICLES

CROSS REFERENCES TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMEN

Not applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable

STATEMENT REGARDING PRIOR DISCLOSURES BY THE INVENTOR OR A JOINT INVENTOR

Not applicable

BACKGROUND OF THE INVENTION

Field of the Invention

The present invention relates to infinitely variable transmission systems to be used to transmit one input of torque and speed, to two outputs with independently varying speeds and torques in forward, reverse and neutral (stop) directions, suitable to be used for differentially steered vehicles.

Description of the Related Art

Differential steering transmission systems are widely used in a range of vehicles from zero-turn lawn mowers to tracked vehicles such as skid steers, and to other vehicles such as robotic vehicles. They operate on the principle of driving the two driving components, such as tracks or wheels, referred to as tracks from here on, on both sides of the vehicle at independently varying speeds and directions. These vehicles can achieve versatile driving operations, from zero-turn, where the tracks are driven at opposing directions, to straight driving in both forward and reverse directions, in a seamless transition of gearing.

Traditionally, this behavior is achieved via use of hydraulic drive systems. The two tracks are driven by hydraulic motors, which are driven by one or more hydraulic pumps. In turn, the hydraulic pumps are driven by the engine. These hydraulic systems run on the same infinitely variable transmission principle, where the operator can hold the output shafts at neutral (stop) position, or turn in forward and reverse directions in infinitesimally incremental adjustments. In many cases, the operator may have two controls, each assigned to control the operation of each track. In the case of a hydraulic piston pump, the controls may change the swash plate angle which adjusts the direction and speed that the hydraulic fluid is delivered to the hydraulic motor, and hence the speed and direction of the rotation of each track.

Same operational behavior is also achieved by the use of electric motors, where dedicated motors drive each track. The motors can be controlled independently in terms of speed, torque and direction. Required electric power may be supplied via batteries or through an engine driven generation system.

Aforementioned systems require the engine output mechanical motion energy to be converted to other forms of energy such as electrical or hydraulic flow, then again to be converted back to mechanical motion energy at the tracks. As a result, these systems carry the burden of efficiency losses, as well as added costs, weight and durability impact.

Other differential steering systems consist of various combinations of differentials, clutches, brakes, gearboxes and hydraulic systems that are utilized more commonly in larger applications. Depending on the arrangement, these systems might have limitations in the function of infinite variability of gearing, steering, and reversibility, compared to the aforementioned hydraulic or electric motor driven systems.

The object of this invention is to create an infinitely variable transmission system that performs the aforementioned functions of hydraulic or electric motor driven systems, without the need for converting mechanical motion energy into any other forms of energy, hence providing simplicity, improved efficiency, durability, weight reduction, and costs savings.

BRIEF SUMMARY OF THE INVENTION

The present invention achieves the infinitely variable transmission functionality for differentially steered vehicles by use of planetary gearboxes and system of variable ratio belt drive pulleys. A power source, such as an engine, motor or human powered system, referred to as engine from here on, is drivingly connected to one of the gear sets of each planetary gearbox via a fixed gear ratio driver, and to another one of the gear sets of each planetary gearbox via a variable gear ratio driver that comprise two or more variable ratio pulleys in various embodiments, hence creating two inputs of torque and speed from the engine to each planetary gearbox. Each track is drivingly coupled to the remaining third gear set of each of the planetary gearboxes, as each one of the outputs of the transmission.

By varying the speed and torque of the two inputs, relative to each other, to the two gear sets of a planetary gearbox, an infinitely variable output, on the third gear set, of speed and torque with forward, neutral and reverse directions is achieved. By further varying the gearing ratio differential between the two variable gear ratio inputs to the two planetary gearboxes, the desired differential steering transmission is achieved.

In various embodiments presented in this invention, the planet gear carrier element of the planetary gearbox is used as the output and hence is drivingly connected to the track. The sun gear is drivingly connected to the variable ratio speed and torque input, while the ring gear is connected to the fixed gear ratio input. This setup results in the low torque loading on the variable ratio pulley system driving the sun gear. It also provides overall speed reduction as the planet gear carrier has the highest speed reduction among the gear sets of a planetary gearbox system, and hence the highest torque output. However, depending on the desired outcome, other combinations of inputs and output may also be used. Care has to be given to the fact that in other setups, the rotational directions of the two input gear elements would need to be same, whereas in this setup, the ring gear and the sun gear are driven in opposite directions. An embodiment is also presented in this invention, where the ring gear is used as the output, while the planet gear carrier element is used as the fixed gear ratio input. The sun gear is still used as the variable ratio input, and the sun gear and the planet gear carrier element are driven in the same direction. The following speed and torque relationships hold in between the gear sets of a planetary gearbox.

$$\omega_{planet\ gear\ carrier} \cdot (R1+1) = \omega_{sun\ gear} + \omega_{ring\ gear} \cdot R1$$

$$\tau_{planet\ gear\ carrier} = \tau_{sun\ gear} \cdot (1+R1)$$

$$\tau_{planet\ gear\ carrier} = \tau_{ring\ gear} \cdot \left(\frac{1+R1}{R1}\right)$$

$$R1 = \frac{\text{ring gear size}}{\text{sun gear size}} = \frac{\text{ring gear teeth count}}{\text{sun gear teeth count}}$$

Where ω and σ stand for rotational speed and torque, respectively.

Accordingly, for the embodiments, where the planet gear carrier element is utilized as the output, to maintain the output shaft, hence the planet gear carrier element, at neutral (stop) position, the ring and the sun gears need to revolve at opposing directions, at a speed ratio equal to the inverse of their size or teeth count ratios, R1.

$$\frac{\omega_{sun\ gear}}{\omega_{ring\ gear}} = -R1$$

As the speed of the sun gear, hence the speed ratio between the sun and ring gears, is varied to higher or lower from this zero point via the variable ratio belt drive pulley system, the planet gear carrier element, hence the output shaft, will start revolving in forward or reverse directions accordingly.

A variable ratio pulley is one, where one or both flanges of the pulley have a conical profile and can be moved linearly along the shaft of the pulley to vary the distance in between the two flanges. This, in turn, changes the radius at which the belt contacts the pulley, and, hence the linear speed that the belt travels at a given rotational speed of the pulley. By coupling a driver pulley and one or more driven pulleys via a belt, a variable ratio belt drive system would be achieved. By controllably varying the flange distances of some or all of the pulleys in this belt drive system, the relative rotational speeds of the driver and the driven pulleys can be varied, hence the gearing ratio between the driver and the driven pulleys. For instance in a variable ratio belt drive system of one driver and one driven pulleys, a low gearing would be achieved by setting the flanges of the driver pulley apart from each other, while setting the flanges of the driven pulley closer to each other, hence letting the belt ride the driver pulley at a smaller radius of contact compared to the driven pulley. This would result in the driven pulley to rotate slower than the driver pulley, hence the low gearing effect.

Variable ratio pulleys and belts are commercially available and commonly utilized in various systems such as the continuously variable belt drive transmission systems (CVT), as found in many scooters, all-terrain vehicles, utility task vehicles also known as side-by-side vehicles. They are also utilized in industrial applications such as conveyer systems, packaging machines, and agricultural equipment, where the variability of speed is desired. Cross sectional side profiles of belts are designed to match the profiles of the pulley flanges on either side of the belt. Various apparatuses for controlling the flange distances, hence the pulley gearing ratios are also commercially available. In many CVT systems, flange distance of the driver pulley is controlled by the shaft speed via the centrifugal weights, and the flange distance of the driven pulley is controlled by a spring force varying in accordance with the driven shaft torsional load. In other applications, apparatuses are available to control the flange distances manually or via actuators. Spring loaded pulleys are also available where the spring maintains a force load on one or both of the flanges, pushing them towards each other. Commonly, the spring is under compression and positioned between the back side of the flange and a block element secured to the shaft. These spring loaded pulleys are commonly coupled via belt with a pulley controlled in a different fashion such as manually or via actuators, to maintain the belt tension and participate in the gearing variation. For instance, when the flanges of a manually controlled pulley are moved closer to each other, hence pushing the belt to a larger radius, the flanges of the spring loaded pulley are pushed further away from each other due to increasing belt tension, hence moving the belt to a smaller radius on the spring loaded pulley.

In one embodiment of this invention, two separate variable ratio belt drive systems are utilized, each drivingly connected to a planetary gearbox. Each variable ratio belt drive system consists of two variable ratio pulleys, one driver and one driven, coupled via a belt, totaling to 4 variable ratio pulleys and two belts for the whole system. By varying the ratios of the two belt drive systems in synchronization and differentially, driving and steering motions are achieved, respectively.

In another embodiment of this invention, two variable ratio driven pulleys, each coupled to drive each of the planet gear carrier elements of planetary gearboxes, are also coupled to each other and to a fixed ratio driver pulley via single belt. The fixed ratio driver pulley is connected to the engine output shaft. The engine is also drivingly connected to the ring gears of both planetary gearboxes via a fixed gear ratio driver. By varying the gearing ratio of the variable ratio driven pulleys in synchronization with each other, motion in forward, reverse and neutral directions with varying magnitude of speed and torque are achieved. By varying the gearing ratio of the two driven pulleys in differential amounts relative to each other, differential speeds between the two outputs shafts, hence the steering is achieved. An idler tension pulley maintains the required tension on the belt, as belt slack changes due to varying of the pulleys' ratios.

In another embodiment of this invention, in a similar setup to the previous embodiment, the two variable ratio driven pulleys are coupled to a driver pulley that is, however, a variable ratio pulley, again via single belt. One or both flanges of the driver pulley may be spring loaded, pushing towards each other, hence maintaining the tension on the belt, helping eliminate the tension idler pulley and providing for a wider range of gearing. Again by varying the gearing ratios of both driven variable ratio pulleys in synchronization with each other, motion in forward, reverse and neutral directions with varying magnitudes of speed and torque are achieved. By varying the gearing ratios of the two driven pulleys in differential amounts relative to each other, the steering is achieved.

In another embodiment of this invention, a variable ratio driver pulley with spring loaded flanges is coupled with a variable ratio driven pulley via single belt. The flanges of the driven pulley are disconnected from each other, and each flange is coupled to a respective planetary gearbox. Each flange can controllably be moved back and forth along a straight line parallel to the flange-belt contact surface angle, in a direction closer to or away from the driver pulley. By moving the flanges in the same direction and amount, hence making them closer and farther from each other, varying forward, reverse and neutral motion control is achieved. By moving flanges in differential amounts or directions, the differential speeds and hence the steering is achieved. The spring loaded flanges of the driver pulley move closer to or apart from each other in response to the controlled varying of the driven pulley ratio to maintain the belt tension, as well as to contribute to the overall belt drive system gear ratio varying.

The last embodiment presented in this invention is similar to the previous embodiment, however illustrates the utilization of different gear sets of the planetary gearboxes for input and output purposes. Also, the planetary gearboxes utilized in this embodiment have same size ring and sun gears, also known as the differential system.

DETAILED DESCRIPTION OF THE INVENTION

References to the accompanying figures are made hereinafter to better describe and illustrate some of the embodiments of the invention. References to position and orientation are made throughout the context to better describe various embodiments of the disclosure to the reader. These references such as left, up, middle are with respect to the appropriate viewing orientation of the respective page of the Figure, as can be deduced by the orientation of the reference numbers and characters of the Figure.

Figure 1:
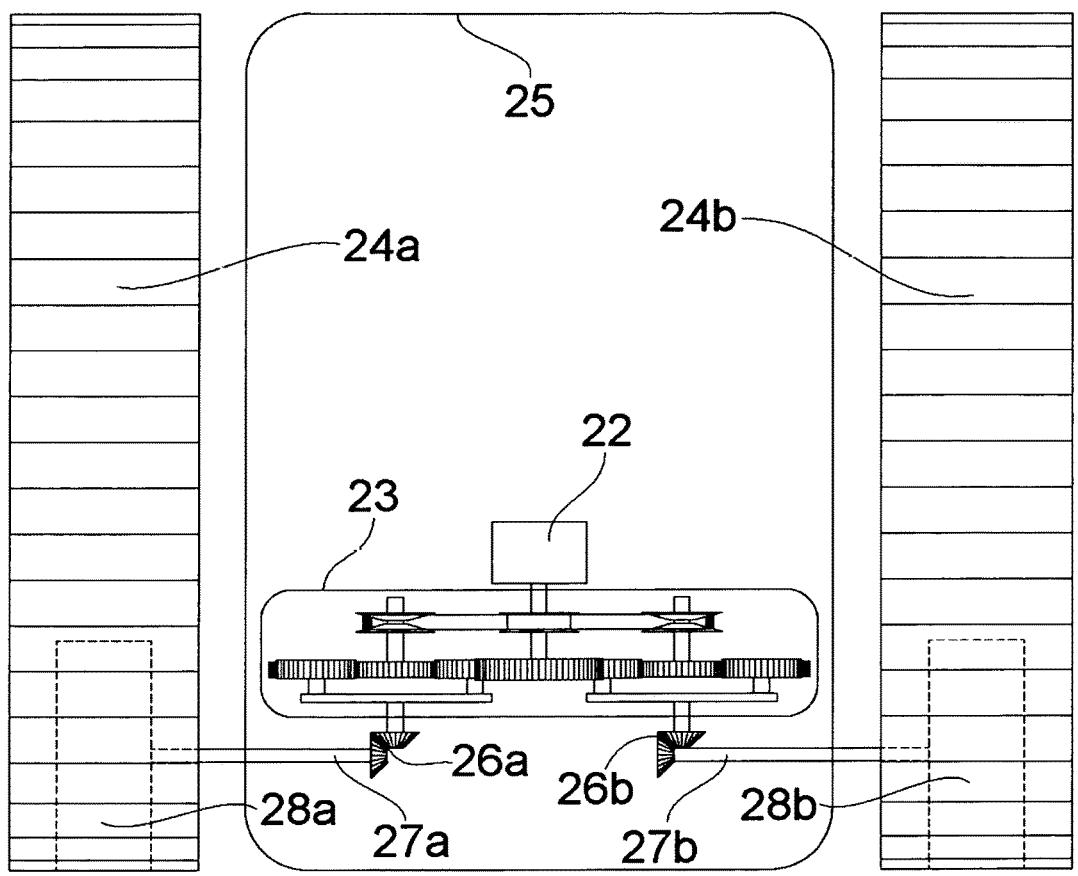
FIG. 1 is a simplified illustration from a top view of a tracked vehicle, illustrating an embodiment of a transmission presented in this invention with respect to engine and driving components, tracks.

FIG. 1 illustrates a simplified, representative view of a tracked $24a$ $24b$ vehicle 25 utilizing an embodiment of a transmission 23 presented in accordance with this invention as a drive source. An engine 22 is drivingly connected to a transmission 23 of the form illustrated in FIG. 4, which is configured to drive the two output shafts. In this embodiment, beveled gear sets $26a$ $26b$ are utilized to couple the transmission output shafts with the respective shafts $27a$ $27b$ of the drive sprockets $28a$ $28b$ of the tracks $24a$ $24b$. This figure illustrates the purpose of the transmission within a differentially steered application. It is to be appreciated that the actual implementation may differ from this illustration, but still fall within the scope of the disclosed invention.

Figure 2:
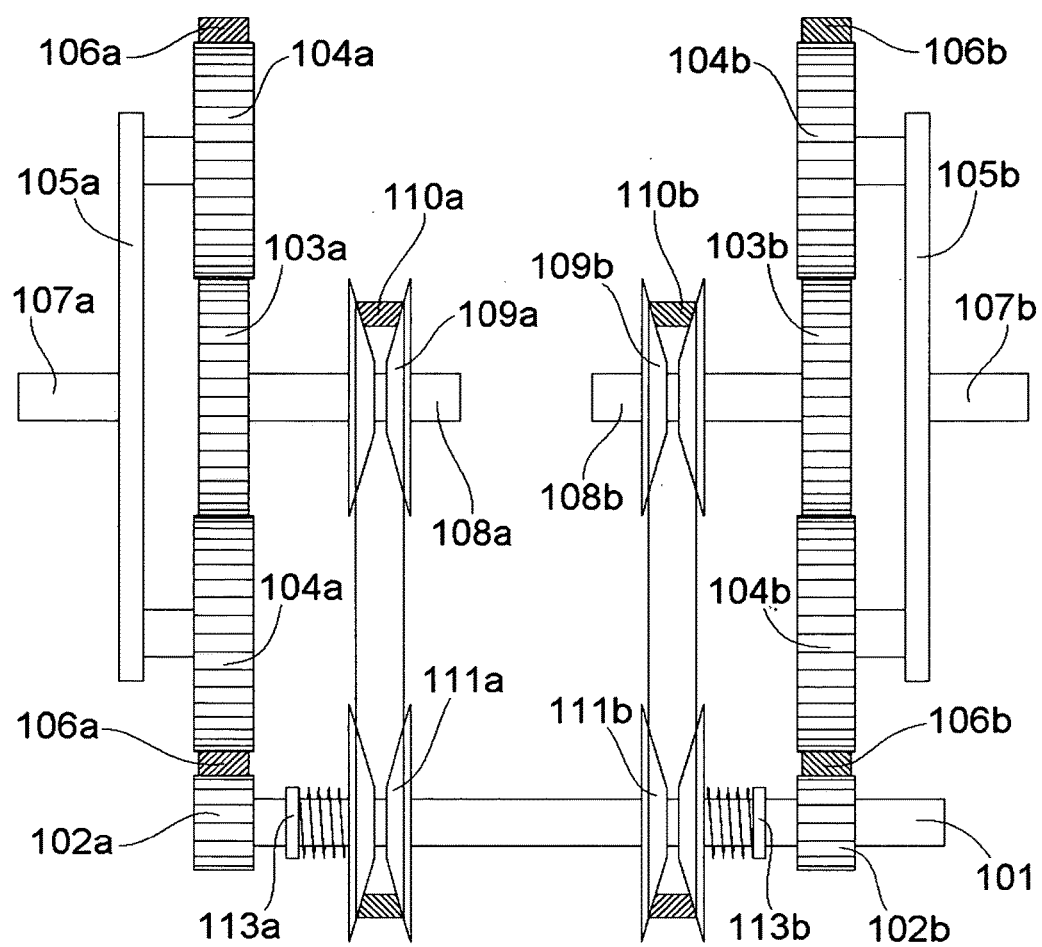
FIG. 2 is a top view illustration of a first embodiment of a transmission presented in accordance with this invention.
Figure 3:
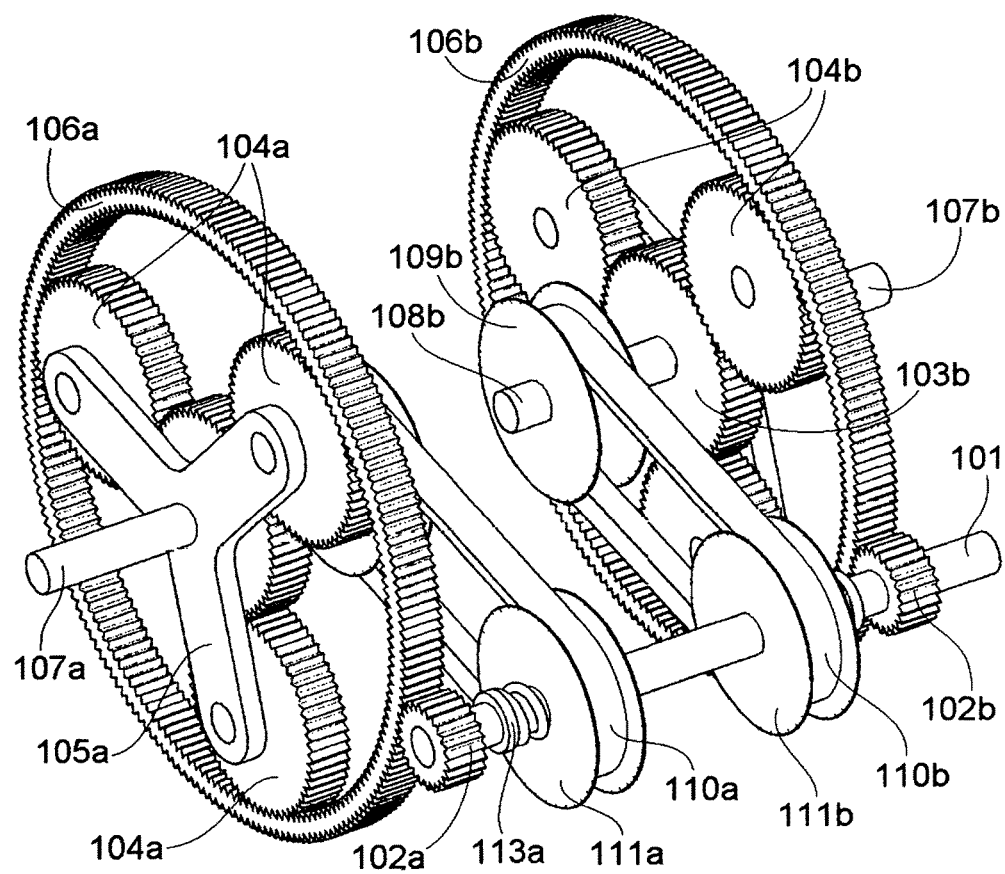
FIG. 3 is a front perspective view of the first embodiment.

FIG. 2 and FIG. 3 illustrate the first embodiment of an Infinitely Variable Transmission in accordance with this invention. The engine shaft 101, driven by the engine, drives the ring gears $106a$ $106b$ of both planetary gearboxes via the respective fixed gear ratio drivers $102a$ $102b$. Hence, both ring gears $106a$ $106b$ are driven at the same speed relative to each other. The engine shaft 101 is also coupled with the two spring loaded $113a$ $113b$ variable ratio driver pulleys $111a$ $111b$, each of which is coupled with a respective variable ratio driven pulley $109a$ $109b$ via a respective belt $110a$ $110b$, to form two variable ratio belt drive systems. The springs $113a$ $113b$ maintain a force load on one or both flanges of both of the driver pulleys $111a$ $111b$, pushing the flanges towards each other. Within each variable ratio belt drive system, the gearing ratio of the driven pulley $109a$ ($109b$) is controllably varied, while the ratio of the driver pulley $111a(111b)$ is, in response, controlled by the spring $113a(113b)$ load, to maintain the belt tension, as well as to vary the overall belt drive system gear ratio. For instance, when the flanges of the controlled driven pulley $109a(109b)$ are set further apart from each other, moving the belt $110a(110b)$ to a smaller radius on that pulley, the flanges of the driver pulley $111a(111b)$ are set closer to each other by the spring load $113a(113b)$ to maintain the tension on the belt $110a(110b)$ and move the belt to a larger radius on that pulley. This action of adjusting the flange distances varies the gearing ratio through the belt drive system. As aforementioned, various apparatuses are commercially available for controllably varying the flange distances, hence the pulley gearing ratio, that can be utilized within these embodiments. In this illustration, driven pulleys $109a$ $109b$ are chosen as the controlled pulleys, while the driver pulleys $111a$ $111b$ are spring loaded $113a$ $113b$. It is also chosen that only one flange of each pulley is movable along the shaft. For the driven pulleys $109a$ $109b$, the flanges towards the center of the embodiment, and for the driver pulleys $111a$ $111b$, the outer flanges are movable, hence maintaining belt alignment. It is to be appreciated that in alternative embodiments, the opposing flange sets or even both flanges for either or both driven and driver pulleys may be utilized to move along their shafts to achieve the same functionality. If the spring loaded pulley was preferred to have both of its flanges movable, spring load on both flanges may be used. In another alternative embodiment the driver pulleys $111a$ $111b$ may be utilized as the controlled pulley, while the driven pulleys $109a$ $109b$ may be utilized as the spring loaded $113a$ $113b$ pulleys. Also in another embodiment, the spring load $113a$ $113b$ may be eliminated by utilizing both driver $111a$ $111b$ and driven $109a$ $109b$ pulleys as controlled pulleys. Accordingly, flanges of both pulleys would controllably be moved along their shafts in opposing directions, to maintain the belt tension and vary the gearing ratio. A rubber style belt is suitable for this embodiment as it is common for many applications of variable ratio belt drive systems, such as CVT systems; however metal based belts may also be utilized as well.

Each driven pulley 109a 109b is then coupled with the respective sun gear 103a 103b via a respective shaft 108a 108b. The output shafts 107a 107b are driven by the travel of the respective planet gears 104a 104b around the respective sun gears 103a 103b via the respective planet gear carrier elements 105a 105b. Each planet gear 104a(104b) is free to rotate about the respective shaft that couples it to the respective carrier element 105a(105b). The output shafts 107a 107b are ultimately connected to drive the respective tracks of the vehicle.

The following speed relationship holds true for a planetary gearbox and a variable ratio belt drive system, coupled according to embodiment one, as well as according to embodiments two, three and four, where the belt drive system is coupled with the sun gear, the fixed ratio driver is coupled with the ring gear and the planet gear carrier element is utilized as the output shaft.

$$w_o = w_e \cdot \left( \frac{fgr - R1 \cdot vgr}{(1 + R1) \cdot vgr \cdot fgr} \right)$$

Where $w_o$ is the output shaft 107a(107b) speed, $w_e$ is the engine shaft 101 speed, R1, as aforementioned, is the gear ratio between ring gear 106a(106b) and sun gear 103a (103b), fgr is the gear ratio between engine driver gear 102a(102b) and the ring gear 106a(160b), such as the ring gear outside teeth count divided by the engine driver gear teeth count, and vgr is the gear ratio through the variable ratio belt drive system, such as the belt contact point radius on the driven pulley 109a(109b) divided by the belt contact point radius on the driver pulley 111a(111b), which is variable via controlling the flanges. Accordingly, by consideration of these ratios, desired gear and pulley sizes can be determined to produce the desired ranges of motion of the vehicle through this transmission. According to this arrangement, the output shaft 107a(107b) will be at neutral (stop) condition when fgr=R1·vgr. By varying the vgr ratios higher or lower from this point, by controlling the flange distances of the driven pulleys 109a 109b in embodiment one, by the same magnitude for both planetary gearboxes, the output shafts 107a 170b would deviate from neutral, in terms of rotational speed, by the same magnitude and hence straight motion in forward or reverse directions would be achieved. By varying the vgr ratios in differential amounts between the two planetary gearboxes, the output shafts 107a 107b would rotate in differential speeds relative to each other and hence steering action would be achieved.

Figure 4:
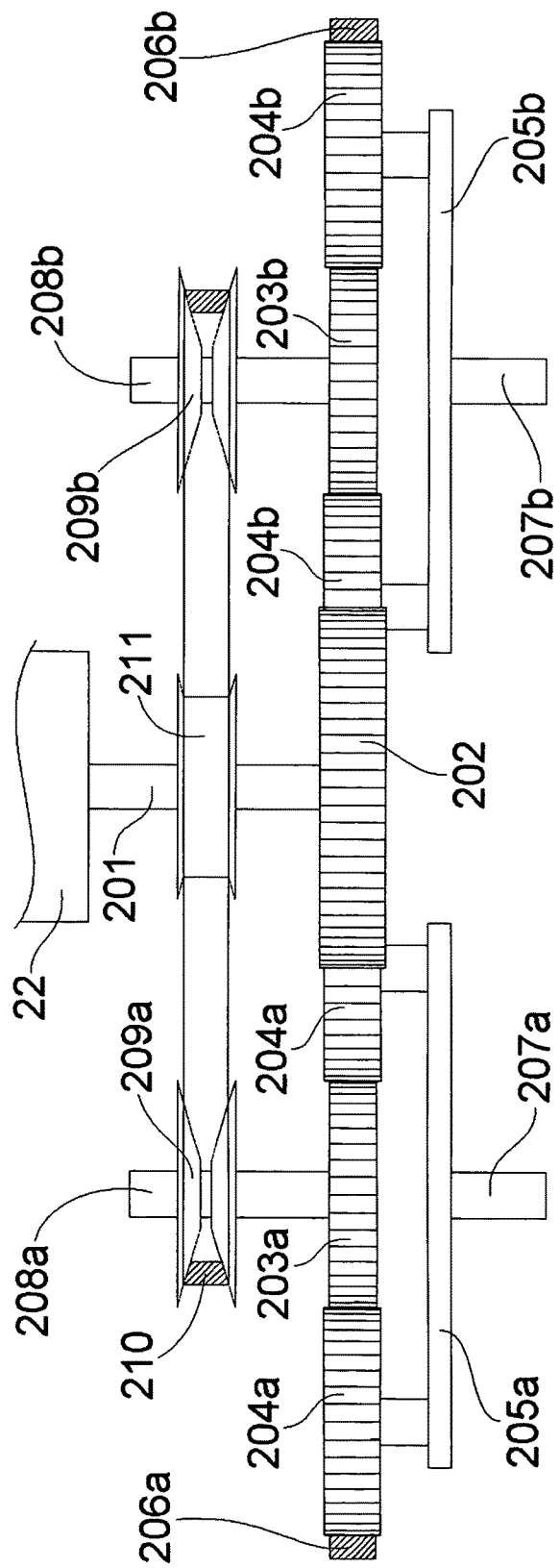
FIG. 4 is a front view illustration of a second embodiment of a transmission presented in accordance with this invention.
Figure 5:
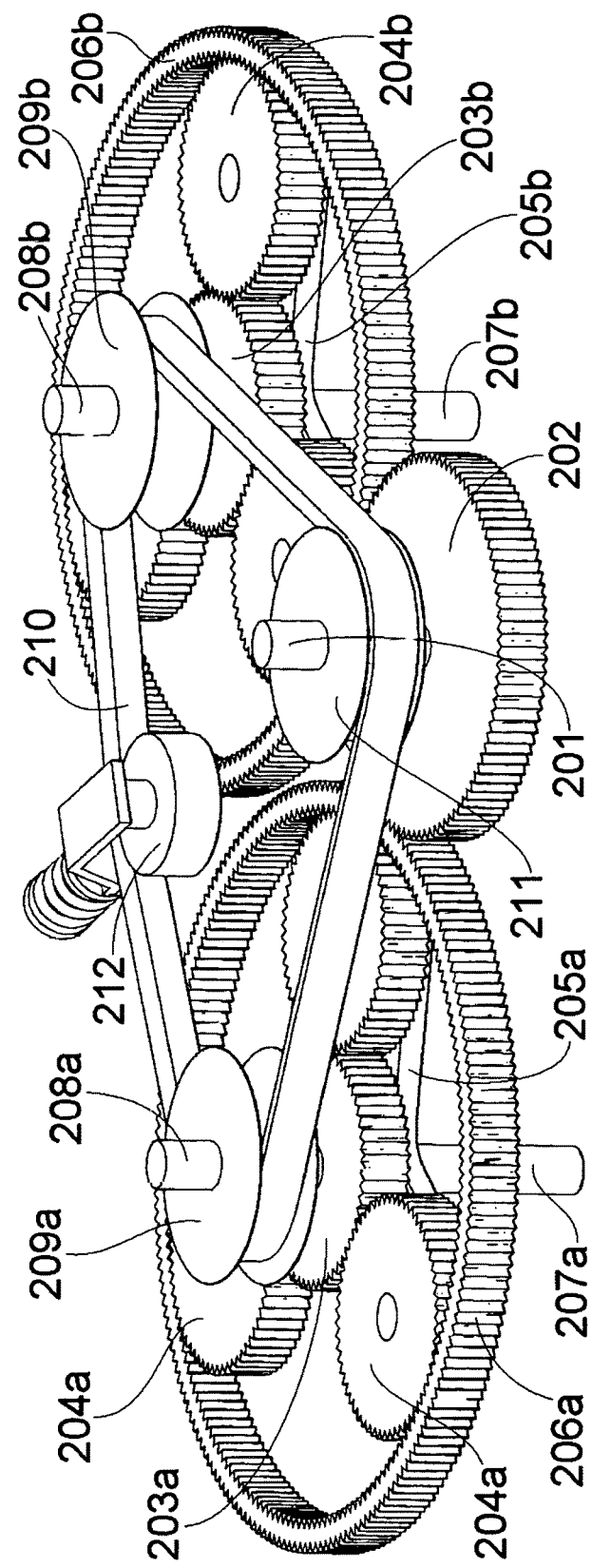
FIG. 5 is a front perspective view of the second embodiment.

Referring to FIG. 4 and FIG. 5 as a second embodiment of this invention, an engine 22 is drivingly connected to a fixed ratio driver pulley 211, and to a fixed gear ratio driver 202 via the engine shaft 201. A single belt 210 couples the fixed ratio pulley 211 with two variable ratio driven pulleys 209a 209b. The fixed ratio driver gear 202 is drivingly connected to the ring gears 206a 206b of both planetary gearboxes. Similar to embodiment one, planet gear sets 204a 204b of both planetary gearboxes are each coupled to drive the respective output shafts 207a 207b via the respective carrier elements 205a 205b, which in turn drive the respective tracks of the vehicle. Again similar to embodiment one, sun gears 203a 203b are drivingly connected to the respective driven pulleys 209a 209b via the respective shafts 208a 208b. Also operationally similar to embodiment one, by controllably varying the distances between the flanges, hence the gearing ratios, of both variable ratio driven pulleys 209a 209b in synchronization with each other, straight motion in forward and reverse directions would be achieved. By varying gearing ratios in differential amounts between the two driven pulleys 209a 209b, the steering action would be achieved. A tensioner idler pulley 212 (FIG. 5) maintains the belt tension as flange distances are varied among the driven pulleys 209a 209b, hence the slack of the belt 210. The tensioner pulley 212 may also be used controllably to engage and disengage the transmission for vehicle braking, towing or start-up purposes. By releasing the tension on the belt 210, the driven pulleys 209a 209b would be disengaged from the driver pulley 211, and hence the sun gears 203a 203b would be disengaged from the engine 22. The engine would then drive only the rings gears 206a 206b, which in turn would drive the sun gears 203a 203b in the opposite direction of the ring gears 206a 206b by way of least resistance path, leaving the planet gears 204a 204b, hence the carrier elements 205a 205b and the output shafts 207a 207b in freewheeling motion. Controllable spring loaded engagement/disengagement tensioner pulleys are commonly utilized in many belt drive applications such as riding lawn mowers.

Figure 6:
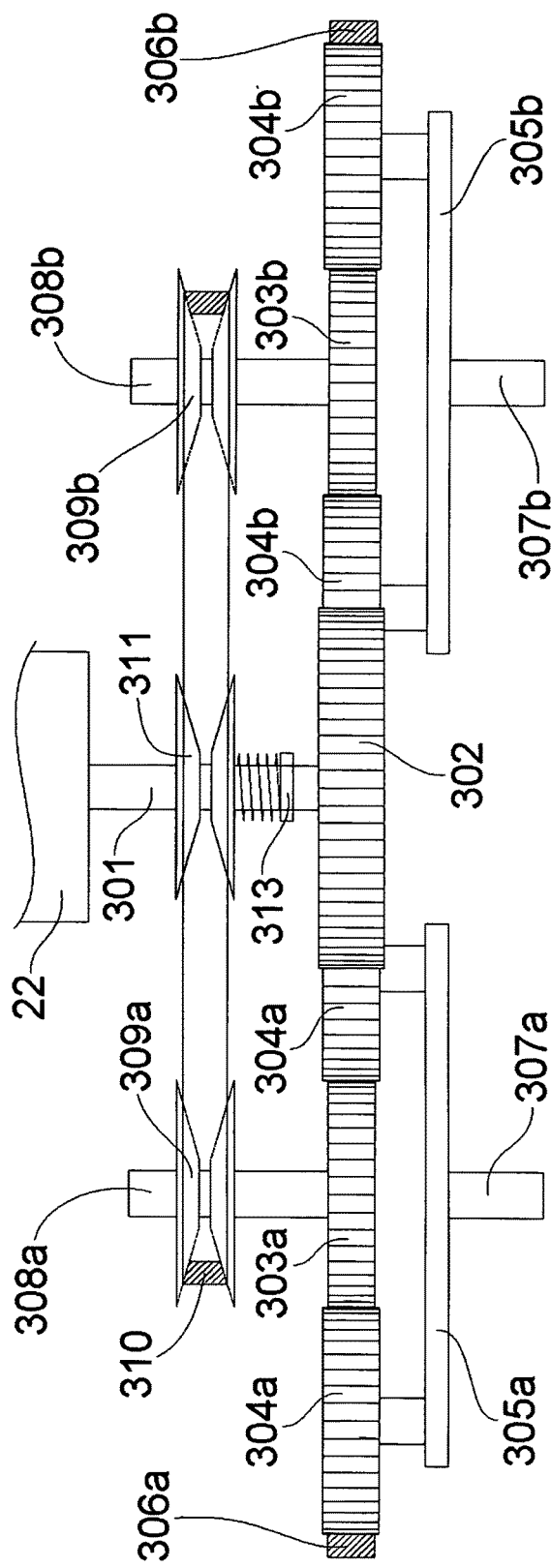
FIG. 6 is a front view illustration of a third embodiment of a transmission presented in accordance with this invention.
Figure 7:
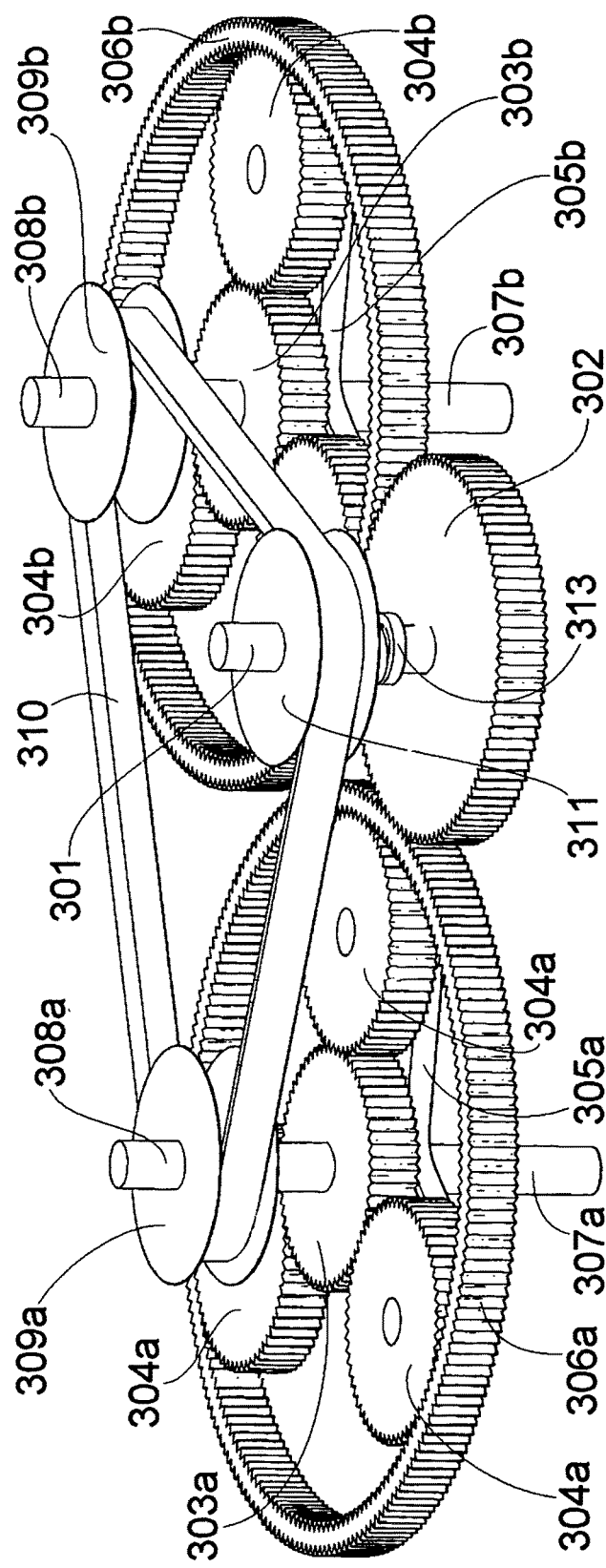
FIG. 7 is a front perspective view of the third embodiment.

A third embodiment as outlined in FIG. 6 and FIG. 7 is similar to embodiment two, however differs from embodiment two by the fact that it utilizes a spring loaded 313 variable ratio driver pulley 311, in place of the fixed ratio driver pulley 211 of embodiment two, and the tensioner pulley 212 is absent. Similar to the spring loaded 113a 113b driver pulleys 111a 111b in embodiment one, the spring load 313 for the driver pulley 311 maintains a force load on one or both flanges towards each other. As the gearing ratios of the driven pulleys 309a 309b are controllably varied, the ratio of the driver pulley 311 varies in response, under the spring load, to maintain the belt 310 tension. This spring loaded 313 ratio-varying function of the driver pulley 311 in response to the controlled ratio-varying function of the driven pulleys 309a 309b also allows for the overall belt drive pulley system to deliver a wider range of gearing ratio compared to embodiment two, for similarly sized pulleys. Accordingly, in a similar layout as in embodiment two, the engine 22 is drivingly coupled with the spring loaded 313 variable ratio driver pulley 311 and the fixed ratio driver gear 302 via the engine shaft 301. The driver pulley 311 is coupled with the two driven variable ratio pulleys 309a 309b via single belt 310. The driver gear 302 is coupled with the ring gears 306a 306b of the planetary gearboxes, hence both rings gears 306a 306b rotate at the same speed and direction. The driven pulleys 309a 309b are each drivingly connected with each of the respective sun gears 303a 303b via the respective shafts 308a 308b. The planet gear sets 304a 304b are free to rotate around their respective shafts that connect them to the respective planet gear carrier elements 305a 305b. The two output shafts 307a 307b are connected to each of the respective carrier elements 305a 305b, which are driven by the travel of the planet gears 304a 304b in between the respective ring 306a 306b and sun gears 303a 303b. The output shafts 307a 307b, in turn, are connected with the respective tracks on either side of the vehicle.

Operationally similar to embodiment two as well, straight motion of vehicle in forward and reverse directions is achieved by varying the gearing ratios of the two driven pulleys 309a 309b in synchronization with each other, while the steering is achieved by differential varying of the gearing ratios relative to each other.

In an alternative embodiment, the spring loaded 313 variable ratio driver pulley 311 of embodiment three may be replaced by a controllable pulley, just as the two driven pulleys 309a 309b. In this arrangement, straight motion in forward, reverse, and neutral (stop) directions would be achieved by varying the gear ratio of the controllable driver pulley, and the steering would be achieved by differentially varying the driven pulleys 309a 309b. A tensioner idler pulley as in embodiment two may be used to compensate for the changing slack of the belt due to varying of the pulley ratios, and so to maintain the tension. In another embodiment, the tensioner idler pulley may be eliminated by implementing a gearing ratio varying methodology that coordinatingly controls the driver and the driven pulleys to maintain the belt tension. For instance, when the distance between the flanges of the driver pulley is increased to achieve a straight motion, the distances between the flanges of the two driven pulleys can controllably be reduced, by the same amount between the two driven pulleys, to compensate for the slack and hence maintain the tension.

The upper flanges of the driven pulleys, and the lower flange of the driver pulley for embodiments two and three are designated as movable within the presented illustrations. In alternative embodiments, opposing flanges or both flanges of these pulleys may be utilized as movable, and still fall within the scope of the disclosed invention. Similarly, spring load may be utilized on both flanges of the driver pulley for embodiment three as well. Similar to embodiment one, various belt types, such as rubber based or metal based belts, may be utilized for the application.

Figure 8:
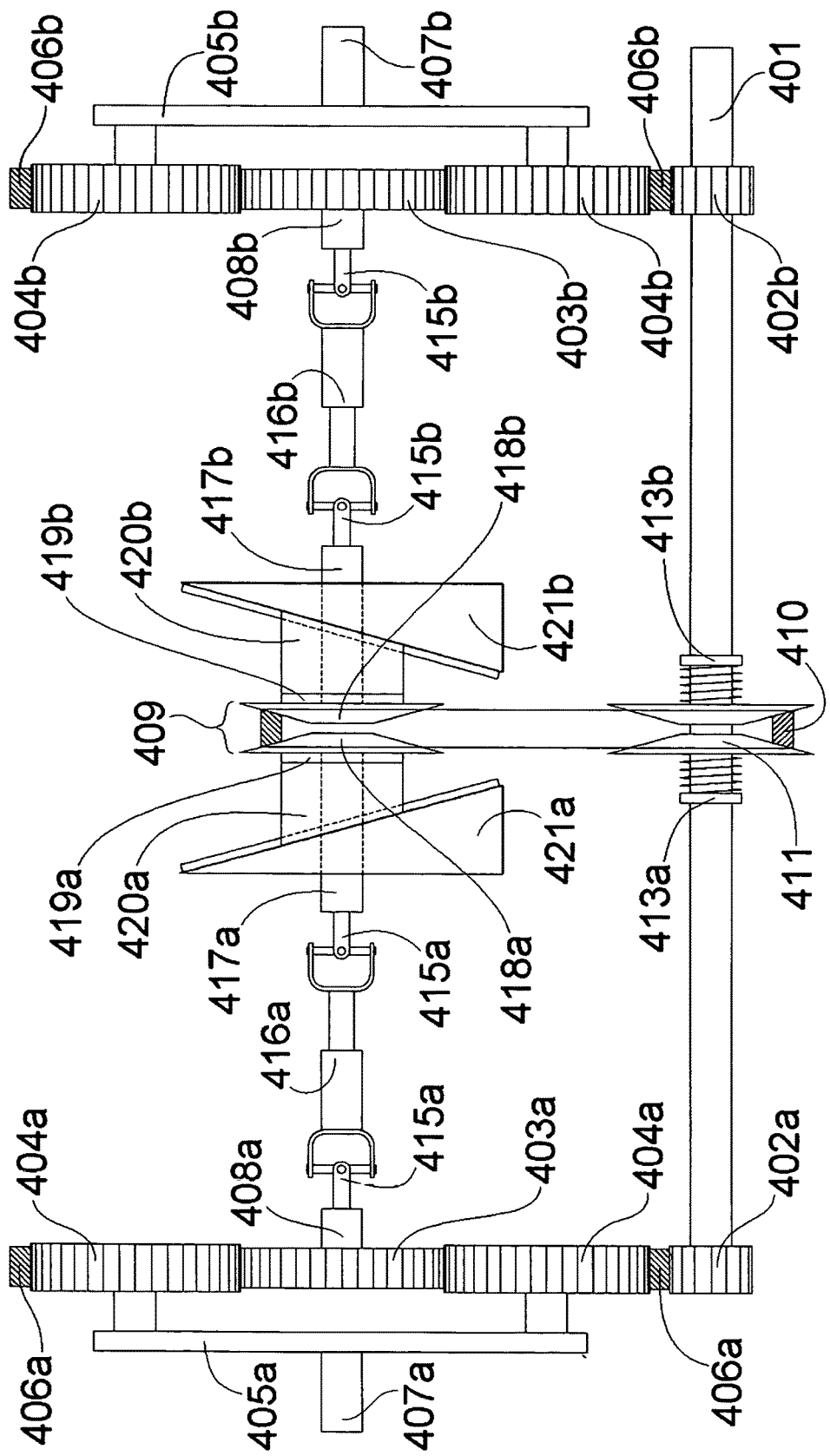
FIG. 8 is a top view illustration of a fourth embodiment of a transmission presented in accordance with this invention.
Figure 9:
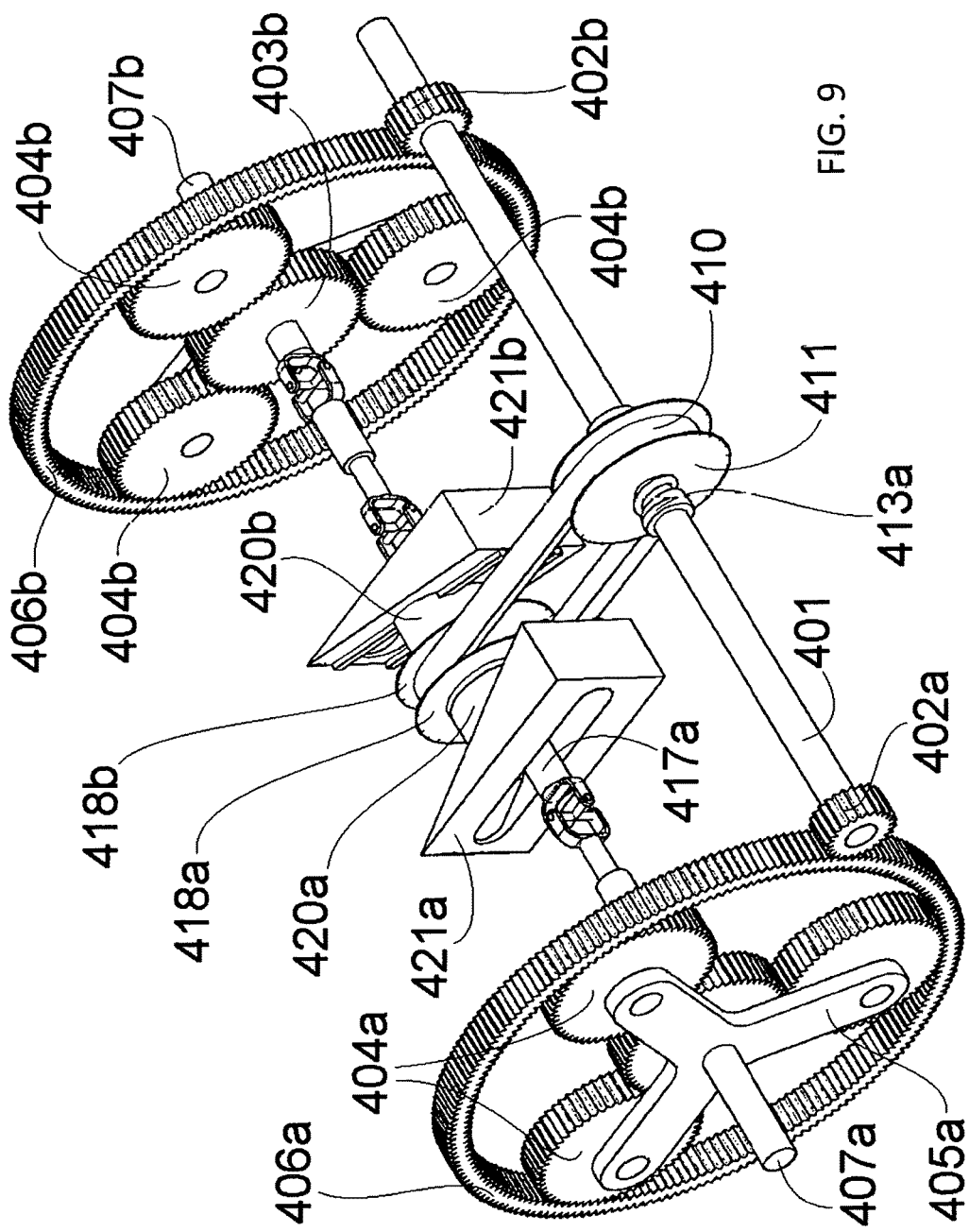
FIG. 9 is a front perspective view of the fourth embodiment.
Figure 10:
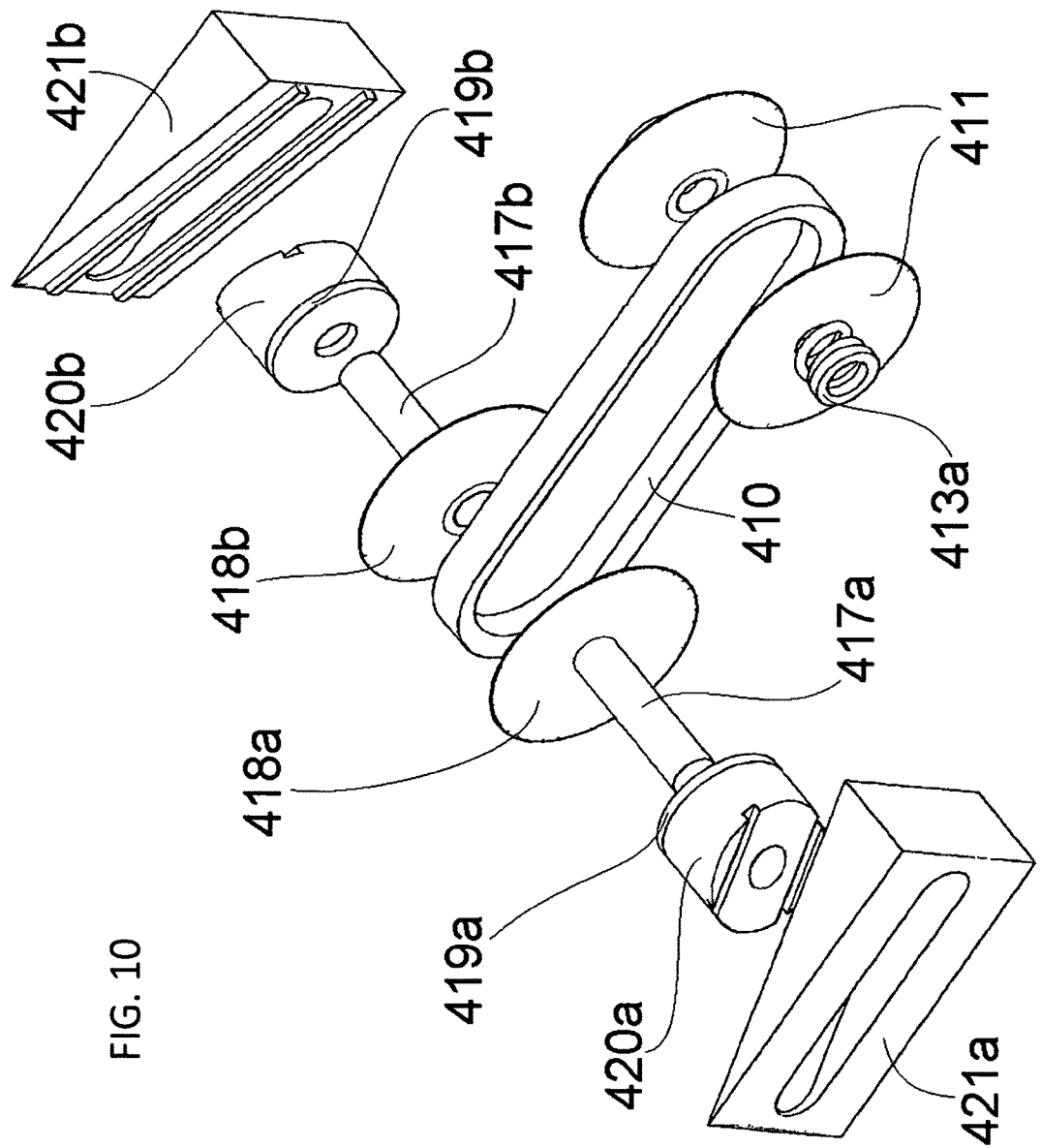
FIG. 10 is a front exploded perspective view of the variable ratio pulley belt drive system of the fourth embodiment.

FIG. 8, FIG. 9, and FIG. 10 illustrate a fourth embodiment of a transmission in accordance with this invention. The engine shaft 401, driven by the engine, drives the rings gears 406a 406b of both planetary gearboxes via the respective fixed gear ratio drivers 402a 402b. The engine shaft 401 is also drivingly coupled to a spring 413a 413b loaded variable ratio driver pulley 411. The springs 413a 431b maintain a force load on both flanges, towards each other, of the driver pulley 411. The driver pulley is coupled to a variable ratio driven pulley 409 via single belt 410. The driven pulley 409 comprises two flanges 418a 418b that are disconnected from each other. Each flange 418a 418b of the driven pulley 409 is connected to a respective shaft 417a 417b. Each flange shaft 417a 417b is coupled with a respective sun gear 403a 403b via a respective flexible and extending coupling arrangement comprising telescopic shafts 416a 416b, universal joints 415a 415b, and respective sun gear shafts 408a 408b. Each flange 418a 418b and shaft arrangement 417a 417b is secured to its position and orientation by a respective housing element 420a 420b. Each housing element 420a 420b provides rotational freedom to a respective flange 418a 418b and shaft 417a 417b arrangement via a thrust bearing 419a 419b against the respective flange 418a 418b and a radial bushing or bearing around the respective shaft 417a 417b. The rotational freedom is around the axis of each respective shaft 417a 417b. Each housing element 420a 420b is supported by a respective guide block 421a 421b. Each guide block 421a 421b, secures each respective housing element 420a 420b, and hence the respective flange 418a 418b and shaft 417a 417b arrangement, to its respective position and orientation, but allows only for one freedom of linear motion, via inter-engaging guides and grooves, that is along the contact surface between the respective block 421a 421b and the housing element 420a 420b. The guide blocks 421a 421b also allow for the respective shafts 417a 417b, to pass through a slot which allow for the rotational motion of the shafts 417a 417b, as well as the aforementioned linear motion. As also can be interpreted from FIG. 8, this linear motion for each housing element 420a 420b is parallel to the respective flange-belt contact surface angle determined by the cross-section of the driven pulley flanges 418a 418b created by the cutting surface extending through the center axes of the engine driver shaft 401 and the driven pulley flange shafts 417a 417b, as well as the output shafts 407a 407b. Guide blocks 421a 421b are secured to their positions such that their relative positions with respect to each other and with respect to driver pulley 411, engine shaft 401, and the planetary gearboxes are fixed. Hence the guide blocks 421a 421b are likely to be secured to the same body as these other components, such as the vehicle frame or transmission enclosure body. In a similar setup as to previous embodiments, the rings gears 406a 406b of both planetary gearboxes are driven at the same speed and direction, relative to each other, via the respective fixed ratio driver gears 402a 402b, while the sun gears 403a 403b can be driven at varying speeds through the variable ratio belt drive system. The planet gears 404a 404b are connected to a respective carrier element 405a 405b with a freedom of rotation around the axis of their shafts. The output shafts 407a 407b are also connected to each of the respective carrier elements 405a 405b. The resulting circular traveling motion of the planet gears 404a 404b, due to the differential rotational motions of respective sun 403a 403b and ring 406a 406b gears, rotate the carrier elements 405a 405b, and hence the output shafts 407a 407b, which ultimately drive the respective tracks of the vehicle.

Figure 11:
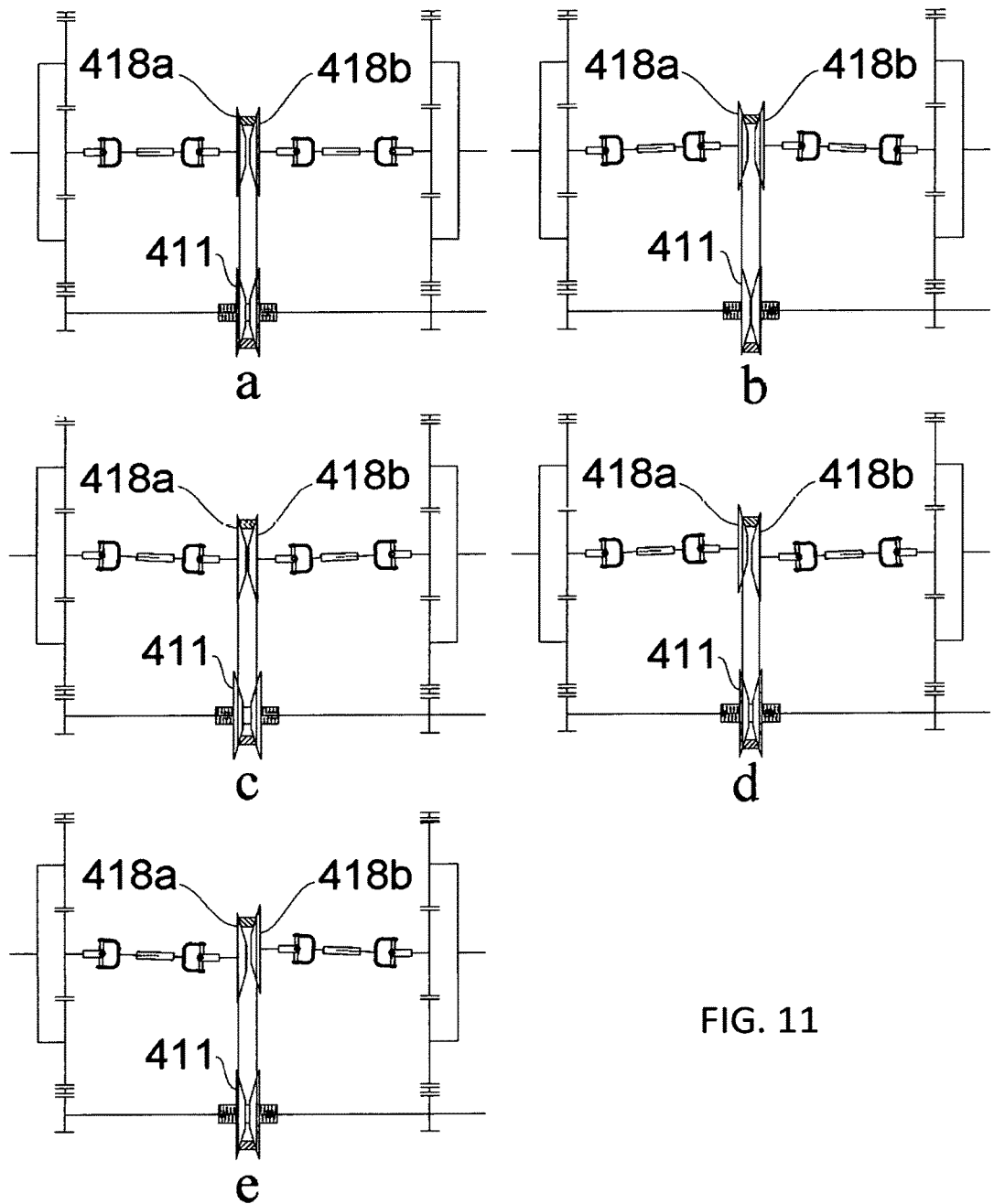
FIG. 11 is a layout of the various principal modes of operation of the transmission in the fourth embodiment.

FIG. 11 illustrates the principal modes of operation of the fourth embodiment as a result of the aforementioned movement of the flanges 418a 418b. Illustrations a, b, and c in FIG. 11 may represent the varying modes of straight motion of operation in forward, reverse and neutral directions. Illustration a is designated as the neutral (stop) position, where the axes of rotation of the driven pulley flanges' shafts 417a 417b are in line with each other, causing both flanges 418a 418b to rotate at the same speed, and the distance between the flanges 418a 418b are such that the resulting variable belt drive gearing ratio, vgr, for both planetary gearboxes provides for the aforementioned fgr=R1·vgr equation to hold true. At this point, the ratio of the rotational speed of sun, to the rotational speed of ring gear equals to $-R1$, $\omega_{sun\ gear}/\omega_{ring\ gear}=-R1$, for both planetary gearboxes and hence the output shafts 407a 407b of both planetary gearboxes are held at neutral (stop) position. In illustration b, both flanges 418a 418b are moved upwardly, in a synchronized fashion, by the same amount, such that their axes of rotation are still in line, allowing the belt to ride the driven pulley 409 at a smaller radius than in illustration a. In response, the flanges of the spring loaded 413a 413b driver pulley 411 move closer to each other, to move the belt to a larger radius on the driver pulley, to maintain the belt tension, as well as to lower the vgr ratio by the same amount for both planetary gearboxes. As a result, the sun gears of both planetary gearboxes would rotate faster than in illustration a, and depending on the ratios utilized between other gear set components, this would result in a forward or reverse rotational movement by the same speed, on both output shafts, 407a 407b. In illustration c, both flanges are moved downwardly, again in a synchronized fashion, by the same amount, hence their axes of rotation are still in line. The flanges are closer to each other than in illustration a, hence the belt rides the driven pulley 409 at a larger radius than in illustration a. As a result, the increased belt tension pushes the flanges of the driver pulley 411 further apart from each other, moving the belt to a smaller radius on the driver pulley 411. The vgr ratio increases by the same amount for both planetary gearboxes, and hence the sun gears for both planetary gearboxes rotate slower than in illustration a. Accordingly, the output shafts 417a 417b rotate at the same speed relative to each other, but in the opposite direction than in illustration b.

Illustration d and e represents two of the various modes of steering operation. Accordingly, in illustration d, the left flange 418a is moved upwardly, while the right flange 418b is moved downwardly. At this point, the axes of rotation of both flanges 418a 418b are offset from each other but still parallel to each other, and the belt contacts the two flanges 418a 418b over different contact profiles, such that the belt rides the left flange 418a over an average contact profile of smaller radius, and the right flange 418b over an average contact profile of larger radius. Accordingly, the left flange 418a provides for a lower vgr ratio for the left planetary gearbox and rotates with a faster rotational speed than the right flange 418b, which provides for a larger vgr ratio for the right planetary gearbox. Resultantly, the output shafts 407a 407b rotate in opposing directions relative to each other, providing the steering action. In illustration e, the flanges are moved in a similar fashion but in opposing directions than in illustration d. Accordingly, the output shafts rotate in opposing directions than in illustration d, hence achieving steering in the opposing direction than in illustration d.

Figure 12:
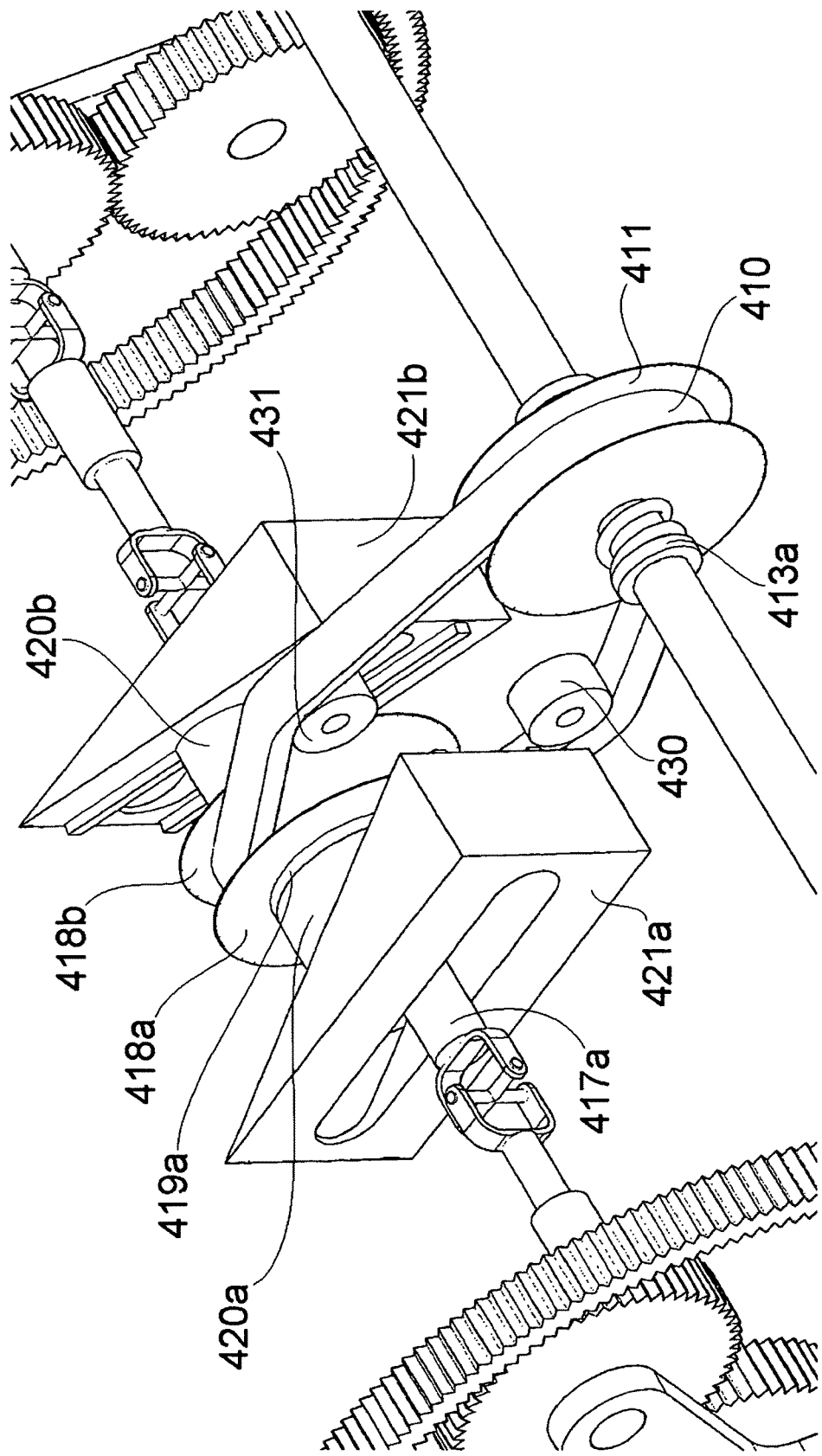
FIG. 12 is a front perspective view of an alternative form of the variable ratio pulley belt drive system of the fourth embodiment, illustrating the use of idler pulleys.

In modes of operation, where the flanges 418a 418b are moved differentially, two of which are presented in FIG. 11, illustrations d and e, the belt 410 possesses different contact profiles between the two flanges 418a 418b, as well as varying contact radii along the arc of contact on each flange 418a 418b, which may result in additional belt 410 behavior characteristics such as slip, flex or twist. Hence, an optimum arc of belt 410 contact may be preferred, particularly over the driven pulley flanges 418a 418b, to limit the extent of such additional belt 410 behavior. Hence an alternative embodiment, as presented in FIG. 12, may be employed where one or more idler pulleys 430 431 may be utilized between the driver 411 and the driven 409 pulleys, stationary or dynamic, to provide such desired arc of belt 410 contact, particularly over the driven pulley 409.

A belt engagement and disengagement mechanism may also be implemented by moving the flanges 418a 418b of the driven pulley 409 apart from each other beyond the extent that the driver pulley 411 can compensate, rendering the belt 410 loose. This may be achieved by limiting the travel of the flanges of the driver pulley 411 either within the spring 413a 413b load system or simply by letting the flanges of the driver pulley 411 abut each other. Another means of disengaging the belt 410 maybe possible by controllably moving the flanges of the driver pulley 411 apart from each other, against the spring loads 413a 413b. Moving the flanges 418a 418b of the driven pulley 409 apart from each other to the point where the belt 410 can fit through the gap in between may also be used as a means for belt replacement.

In an alternative embodiment, the controlling of the gearing ratio through the belt drive system may also be achieved by replacing the spring loaded 413a 413b driver pulley 411 by a controllable variable ratio pulley. Similar modes of operation can be achieved by controllably varying the ratio of the driver pulley, in coordination with the aforementioned controlled varying of the driven pulley 409, such that the belt 410 tension is maintained during the operation.

In the embodiment presented here, the controlled moving of the flanges 418a 418b can be achieved by moving the housing elements 420a 420b along the guide blocks 421a 421b. For instance, to use this transmission in a zero-turn lawnmower application, two handlebar controls may be coupled via linkage arms to the housing elements 420a 420b to resemble the control style of common hydraulically driven zero-turn lawnmowers. However, the significance of the embodiment is the aforementioned linear movement of the flanges 418a 418b, hence it is to be appreciated that the mechanism introduced in this specification for the desired movement of the flanges 418a 418b may also be achieved by alternative methods, such as different bracket or housing designs, and still fall within the scope of the disclosed invention. Similarly, alternative forms of flexible and extending couplings between the flanges 418a 418b and the respective sun gears 403a 403b, such as CV joints, may also be employed.

Figure 13:
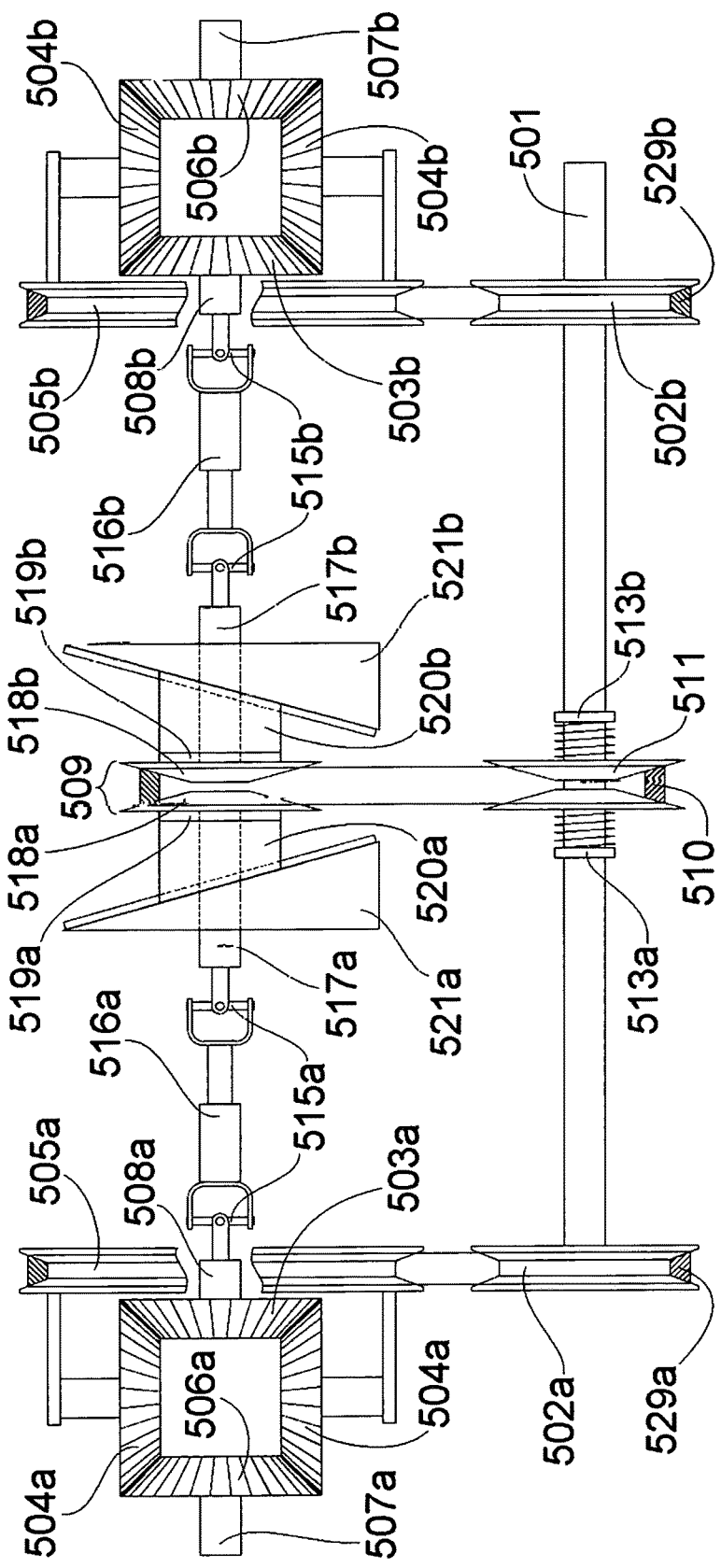
FIG. 13 is a top view illustration of a fifth embodiment of a transmission presented in accordance with this invention.
Figure 14:
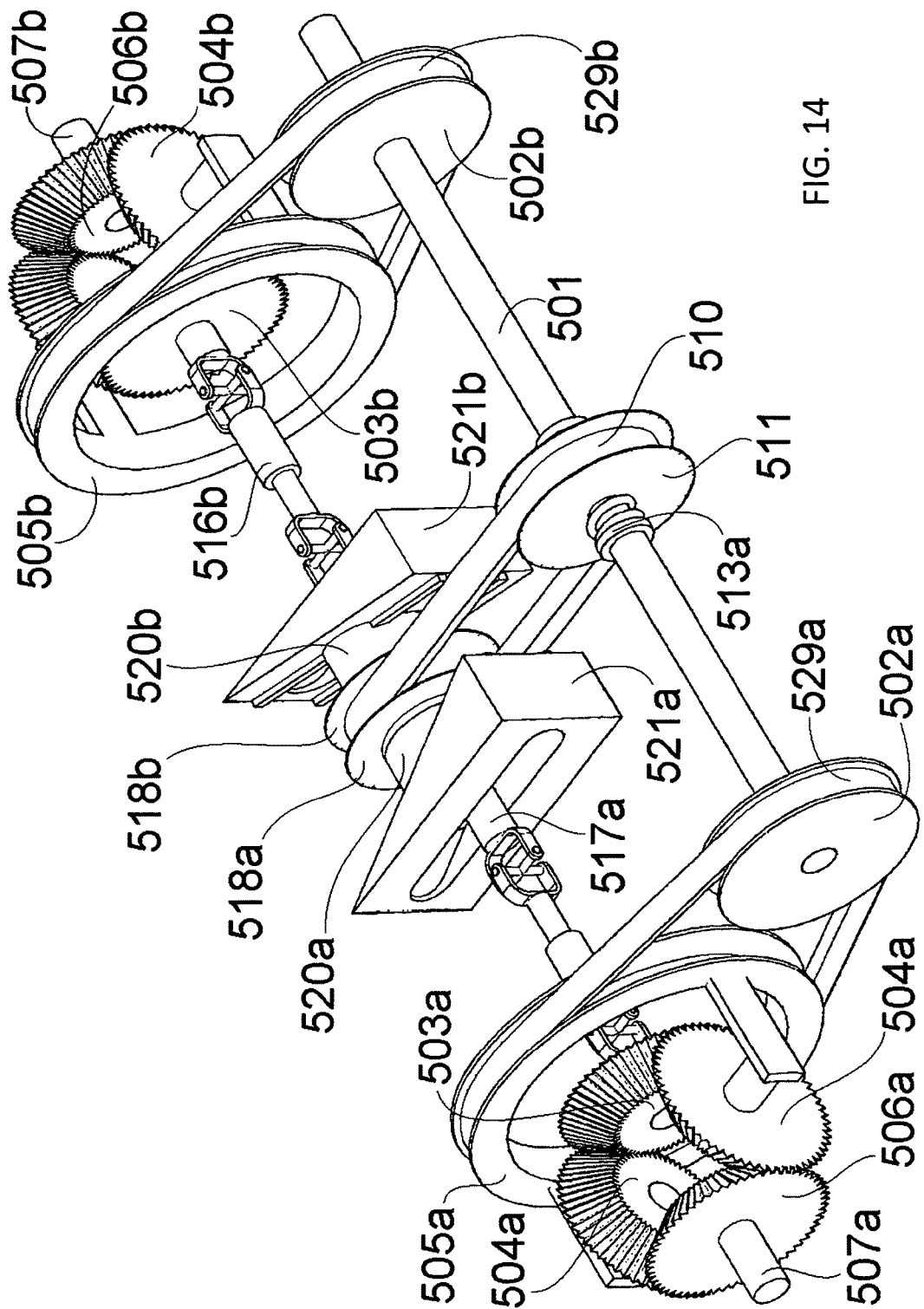
FIG. 14 is a front perspective view of the fifth embodiment.

FIG. 13 and FIG. 14 illustrate a fifth embodiment of a transmission in accordance with this invention. This embodiment is similar to embodiment four, however, utilizes the sun gear sets 503a 503b and the planet gear sets 504a 504b along with the carrier elements 505a 505b of the planetary gearboxes as inputs, and the ring gear sets 506a 506b as outputs. Accordingly, the engine shaft 501, driven by the engine, drives the planet gear carrier elements 505a 505b of both planetary gearboxes via the respective fixed ratio driver pulleys 502a 502b and belts 529a 529b. The planetary gearboxes utilized in this embodiment have same size sun 503a 503b and ring 506a 506b gears, also commonly known as differential system. The planet gears 504a 504b are free to rotate about the axes of their respective shafts that couple them to their respective carrier elements 505a 505b, and are placed in between the respective sun 503a 503b and the rings gears 506a 506b in a beveled fashion to achieve the aforementioned same size structure. Following the same structure as in embodiment four for the rest of embodiment five, the engine shaft 501 is also drivingly coupled with the spring loaded 513a 513b variable ratio driver pulley 511, which in turn is coupled via a belt 510 with a variable ratio driven pulley 509. The flanges 518a 518b of the driven variable ratio pulley 509 is disconnected from each other and each is connected to a respective shaft 517a 517b. Each shaft 517a 517b is then coupled with the respective sun gear 503a 503b of each planetary gearbox via flexible and extending coupling arrangement comprising telescopic shafts 516a 516b and universal joints 515a 515b, as well as the respective shafts 508a 508b of the sun gears 503a 503b. Each flange 518a 518b of the driven pulley 509, and each respective shaft 517a 517b are secured to its position and orientation, and guided in the same fashion of linear movement as in embodiment four via the respective housing elements 520a 520b, thrust bearings 519a 519b and the guide blocks 521a 521b. The ring gears 506a 506b are drivingly connected to the respective output shafts 507a 507b.

In this arrangement of inputs and output, in order for the output shaft 507a(507b), and hence the ring gear 506a(506b) of a planetary gearbox to be at neutral (stop) position, the sun gear 503a(503b) and the planet gear carrier element 505a(505b) need to rotate in the same direction, but with the planet gear carrier element 505a(505b) rotating at half the rotational speed of the sun gear 503a(503b). Hence, consideration has to be given accordingly in selecting the appropriate gearing ratios among the inputs to the planetary gearbox system to achieve the desired range of motion. Following the same operational modes as in embodiment four, the straight driving motion in forward, reverse and neutral directions are achieved by moving the flanges 518a 518b in synchronization with each other in the same direction and magnitude, while the steering is achieved by moving the flanges 518a 518b in differential amounts and directions relative to each other. Embodiment five would benefit from all the alternative embodiment considerations as outlined for embodiment four, due to the similar structure.

For all the embodiments presented here, various reasons such as the layout of the system within the vehicle, required arc of belt contact over the pulleys, required gearing ratios between components and hence the required gear and pulley sizes, and serviceability considerations may require the position and orientation of the components of the transmission to vary from the illustrations presented in this context. For instance, a belt coupling, as illustrated in embodiment five, chain drive or worm gear may be utilized between the engine and the utilized gear set of the planetary gearboxes for the fixed gear ratio coupling. Idler gears may be utilized in between gear couplings, such as in between the engine driver gear and the ring gear sets in embodiments one, two, three and four, to vary the position and orientation of the engine shaft with respect to planetary gearboxes. Similarly, other forms of couplings between the variable ratio belt drive system, the engine, as well as the gear sets of the planetary gearbox, such as flexible couplings or beveled gearing, chain drive may be employed. It is, therefore, to be appreciated by the reader to consider these alternative forms of coupling between the components of the transmission, and still fall within the scope of the disclosed invention, so long as the required directions of motion of components and the gear ratios are maintained. Other forms of planetary gearboxes, such as the one illustrated within embodiment five, may also be employed. Also, other forms of biasing elements to provide the function of the spring in spring loaded pulleys may also be employed, such as hydraulic pressure, or other forms of springs.

Depending on the implementation, various methodologies of controlling the variable ratio pulleys may be utilized. For instance, to use this transmission in a common zero-turn lawnmower application, two handlebar controls may be coupled via linkage arms to control each of the apparatuses that control the flange distances for the driven pulleys for embodiments one, two and three, or as aforementioned, each of the housing elements for embodiment four and five, to resemble the control style of common hydraulically driven zero-turn lawnmowers. In another instances, where enhanced control is desired, computerized logic based control systems may be implemented that may control the pulleys via actuators, as well as controlling the other components such as the engine throttle.

What is claimed is:

1. An infinitely variable transmission system for differentially steered vehicles comprising:
    a variable ratio driver pulley having a pair of flanges, comprising a means for continually exerting force on said flanges towards each other, wherein said variable ratio driver pulley is drivingly connected to a power source;
    a variable ratio driven pulley having a pair of flanges, with said flanges disconnected from each other;
    a belt extending around the driver and driven pulleys, forming a variable ratio belt drive system;
    wherein each flange of the driven pulley is controllably and independently movable along a respective straight path that is parallel to the contact line between the belt and the respective flange face; and wherein each flange of the driven pulley is independently rotatable about its respective axis;
    two planetary gearboxes, where gear sets of each are drivingly connected to the power source, a respective variable ratio driven pulley flange, and a respective driving component as output.

2. An infinitely variable transmission system for differentially steered vehicles as in claim 1, in which;
    ring gears of both planetary gearboxes are drivingly connected to the power source;
    a planet gear carrier element of each planetary gearbox is drivingly connected to a respective driving component as a transmission output; and
    a sun gear of each planetary gearbox is drivingly connected to a respective variable ratio driven pulley flange, to be driven in the opposite direction of rotation of the respective ring gear.

3. An infinitely variable transmission system for differentially steered vehicles as in claim 1, in which;
    planet gear carrier elements of both planetary gearboxes are drivingly connected to the power source;
    a ring gear of each planetary gearbox is drivingly connected to a respective driving component as a transmission output; and
    a sun gear of each planetary gearbox is drivingly connected to a respective variable ratio driven pulley flange, to be driven in the same direction of rotation of the respective planet gear carrier element.

4. An infinitely variable transmission system for differentially steered vehicles as in claim 1, further comprising:
    two telescopic extending shafts, each coupled with two universal joint couplings on either ends, with further shafts extending from those universal joints to drivingly connect each driven pulley flange to a respective sun gear;
    two housing elements being positioned on the back side of a respective driven pulley flange, each comprising;
    a thrust bearing positioned in contact with the back side of each respective driven pulley flange;
    an opening through the body of the housing element for each respective flange's shaft to pass through, and to provide radial bearing support for each said shaft;
    a back face machined to be parallel to the straight path of motion of each respective flange;
    a set of straight cut grooves on said back face, running parallel to the respective straight path of motion of each respective flange;
    two guide blocks, stationarily positioned within a body of the transmission, each comprising; a front face, machined to match and be in contact with the back face of a respective housing element;
    raised grooves on said front face to match and slidingly engage with the cut grooves of a respective housing element; a through opening to allow each respective flange's shaft to pass through;
    wherein each housing element is slidable along the face of a respective guide block, to control the operations of the transmission.

* * * * *